(No Model.)

C. D. BAKER.
ELECTRICAL RESISTANCE COIL.

No. 368,804. Patented Aug. 23, 1887.

Witnesses:
E. A. West
Harry T. Jones

Inventor:
Chauncey D. Baker.

UNITED STATES PATENT OFFICE.

CHAUNCEY D. BAKER, OF CHICAGO, ILLINOIS.

ELECTRICAL RESISTANCE-COIL.

SPECIFICATION forming part of Letters Patent No. 368,804, dated August 23, 1887.

Application filed November 24, 1886. Serial No. 219,775. (No model.)

*To all whom it may concern:*

Be it known that I, CHAUNCEY D. BAKER, residing at Chicago, in the county of Cook and State of Illinois, and a citizen of the United States, have invented a new and useful Improvement in Electrical Resistance-Coils, of which the following is a full description, reference being had to the accompanying drawings, in which—

Figure 1:
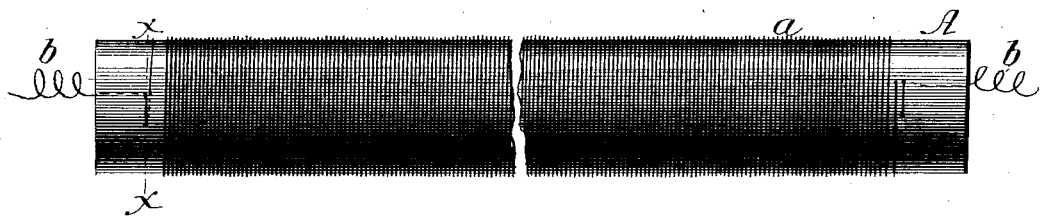
Figure 2:
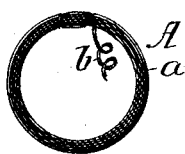
Figure 4:
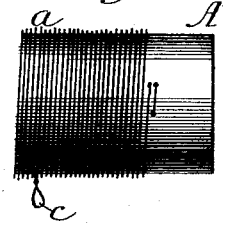
Figure 3:
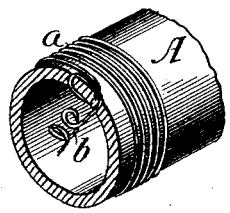

Figure 1 is a side elevation. Fig. 2 is a section at line $x$ of Fig. 1. Fig. 3 is a perspective. Fig. 4 is a modification.

Electrical resistance devices have been formed by winding wire in spiral form without a core, and the coils will not remain separated when fine wires are used, which is desirable. Such devices have also been formed by winding wire on a spool, one layer over another. The result is that too much heat is evolved.

The object of my invention is to obtain a high resistance with little heat and to provide a coil which also maintains its position, which I accomplish by winding a fine wire over a tube which is a non-conductor of electricity, as illustrated in the drawings.

In the drawings, A represents a tube which may be made from asbestus-paper. Around this tube is coiled a fine wire, $a$, the coils being separated so as not to touch each other. Each end of the wire is fastened in the tube by passing the wire through the body of the tube, as shown in Fig. 3, leaving terminals $b$. I apply a coating of shellac or other similar material to the outside of the tube and coiled wire, which aids in keeping the coils separate from each other. German-silver wire may be used.

In use air passes through the tube A and takes up a portion of the heat, keeping the wire comparatively cool. I can use fine wire, which will be supported by the tube, and can thus obtain great resistance in a small space. The resistance can be varied by using different sizes of wire or by varying the number of coils in a tube having a given length. The tube may be of any reasonable desired length. The tube shown is about fifteen inches in length and its diameter about one inch. The resistance-coil is to be placed in a circuit in the usual manner.

In Fig. 4 I have shown a slight modification, in which one or any desired number of loops, $c$, are provided while winding the wire $a$ on the tube, which can be done by looping or twisting the wire at intervals, one of which loops only is shown in Fig. 4. These loops are for the purpose of connecting thereto terminal wires and thereby varying the resistance of the coil.

I do not confine myself to the use of asbestus for making the tubes. Any suitable non-conductor of electricity which will not be materially affected by the heat likely to be generated may be used. It is desirable, but not absolutely essential, to use for the tube a material which is a good conductor of heat.

What I claim as new, and desire to secure by Letters Patent, is—

An electrical resistance-coil consisting of a tube made from material which is a non-conductor of electricity, and fine wire coiled upon the tube in coils not in contact with each other, substantially as and for the purpose specified.

CHAUNCEY D. BAKER.

Witnesses:
E. A. WEST,
ALBERT H. ADAMS.